United States Patent
Alessandro

(10) Patent No.: US 7,602,845 B2
(45) Date of Patent: Oct. 13, 2009

(54) ADAPTIVE FILTER

(75) Inventor: Pierluigi Alessandro, Nuremberg (DE)

(73) Assignee: NXP B.V., Eindhoven (NL)

( * ) Notice: Subject to any disclaimer, the term of this patent is extended or adjusted under 35 U.S.C. 154(b) by 590 days.

(21) Appl. No.: 10/572,474

(22) PCT Filed: Sep. 14, 2004

(86) PCT No.: PCT/IB2004/051749

§ 371 (c)(1),
(2), (4) Date: Mar. 20, 2006

(87) PCT Pub. No.: WO2005/029797

PCT Pub. Date: Mar. 31, 2005

(65) Prior Publication Data

US 2007/0081584 A1    Apr. 12, 2007

(30) Foreign Application Priority Data

Sep. 23, 2003   (EP) .................................. 03103519

(51) Int. Cl.
*H03K 5/159* (2006.01)
*H04B 1/00* (2006.01)

(52) U.S. Cl. .................................... 375/232; 375/152

(58) Field of Classification Search ................. 375/147, 375/148, 232, 344, 350, 130, 136, 143, 144, 375/152, 207, 316, 343; 455/307, 213, 306; 370/320, 335, 342, 441, 290, 291; 73/152.25; 257/533; 307/105; 327/532, 552–555, 564; 333/18, 28 R, 186; 342/101; 379/411; 381/71.11; 708/314

See application file for complete search history.

(56) References Cited

U.S. PATENT DOCUMENTS

| | | | | |
|---|---|---|---|---|
| 4,701,936 A * | 10/1987 | Clark et al. | ................... | 375/232 |
| 5,241,688 A * | 8/1993 | Arora | .......................... | 455/502 |
| 5,272,656 A * | 12/1993 | Genereux | ..................... | 708/322 |
| 5,285,480 A * | 2/1994 | Chennakeshu et al. | ...... | 375/348 |
| 5,446,787 A * | 8/1995 | Lofmark | ................ | 379/406.08 |
| 5,513,221 A * | 4/1996 | Parr et al. | ..................... | 375/344 |
| 5,999,954 A * | 12/1999 | Ludwig et al. | .............. | 708/312 |
| 6,162,608 A * | 12/2000 | Beausang et al. | ............ | 435/7.1 |
| 6,570,863 B1 * | 5/2003 | Kim et al. | .................... | 370/342 |
| 6,771,690 B2 * | 8/2004 | Heikkila | ...................... | 375/147 |
| 7,012,955 B2 * | 3/2006 | Lee et al. | ..................... | 375/224 |
| 7,230,975 B2 * | 6/2007 | Subrahmanya et al. | ...... | 375/148 |
| 7,369,603 B2 * | 5/2008 | Nair | ............................ | 375/222 |
| 7,376,210 B2 * | 5/2008 | Kim et al. | .................... | 375/350 |
| 7,443,826 B1 * | 10/2008 | Atarius et al. | ................ | 370/342 |
| 7,454,209 B2 * | 11/2008 | Subrahmanya | .............. | 455/441 |
| 2003/0038675 A1 * | 2/2003 | Gailus et al. | ................. | 330/107 |
| 2003/0185292 A1 * | 10/2003 | Fernandez-Corbaton et al. | ........................... | 375/232 |
| 2005/0036537 A1 * | 2/2005 | Zancho et al. | .............. | 375/148 |

* cited by examiner

*Primary Examiner*—Tesfaldet Bocure
*Assistant Examiner*—Lawrence B Williams

(57) ABSTRACT

The present invention relates to a filter apparatus and method having a fixed aspect for providing a predetermined selectivity and having an adaptive aspect for determining the frequency response of said filter apparatus. The adaptive aspect is controlled to change the frequency response. Predetermined zero values of the filter characteristic are set to provide a predetermined filter selectivity; and at least one filter parameter is controlled to change pole values of the filter characteristic so as to provide frequency response adaptation. Thereby, the frequency response of the filter operation can change while the filter selectivity can be maintained. The filter apparatus is thus able to cope with advanced system requirements while keeping the complexity and power consumption low.

12 Claims, 5 Drawing Sheets

ADAPTIVE FILTER

The present invention relates to a filter apparatus and method for channel estimation in a receiver of a communication system. In particular, the invention relates to an adaptive filter arrangement for channel estimation, which may be employed in a Rake receiver of a Wideband Code Division Multiple Access (WCDMA) system, such as the Universal Mobile Telecommunications System (UMTS).

Direct Sequence-CDMA (DS-CDMA) communication systems have recently attracted considerable attention as cellular and IMT-2000 communication systems due to their ability to suppress a wide variety of interfering signals including narrow-band interference, multiple access interference, and multipath interference. In the presence of frequency selective fading, the capacity of the system can be enlarged through multipath diversity gained by utilizing a Rake receiver structure as described for example in "Spread spectrum access methods for wireless communications", R. Kohno et al, IEEE Commun. Mag., Vol. 33, pp. 58-67, January 1995.

In wireless communication environments, a received signal experiences large fluctuations, e.g. multipath or small-scale fading, and is non-stationary for distances much larger than a wavelength since the local mean of the fading signal changes significantly as different objects become reflectors. Adaptive methods for channel estimation are associated with a complexity level such that it can be very costly to implement them with current technology. Wiener filtering and Kalman filtering in general would provide the stationary and non-stationary optimum solutions to the problem. These approaches result in algorithms with a degree of complexity typically higher than the simplest solution, i.e. a non-adaptive low-pass filter with a cut-off frequency dimensioned to the maximum Doppler frequency. Also, they rely on the statistics of the channel that must be assumed or estimated, as described for example in "Consistent Estimation of Rayleigh Fading Channel Second-Order Statistics in the Context of the Wideband CDMA Mode of the UMTS", J. M. Chaufray et al, IEEE Transactions on Signal Processing, Vol. 12, December 2001, and "Performance Analysis of Phasor Estimation Algorithms for a FDD-UMTS Rake Receiver", Baltersee et al, IEEE, 2000.

LMS type algorithms based on a linear auto regressive (AR), moving average (MA) or jointly ARMA models of the received signal are considered to provide adaptation features together with a suitable degree of complexity. Basically these approaches approximate the power spectra of the process to be estimated with a rational function and often models of reduced order for reducing complexity have been proposed for example in "Analysis of LMS-Adaptive MLSE Equalization on Multipath Fading Channels", M. C. Chiu et al, IEEE Transactions on Communications, 1996. Motivations for the use of an AR model of low order when the received signal is over-sampled are given, for example, in "The Linear Predictive Estimation in the Rake for Multipath-Fading Channel with White Noise of General Distributions", Q. Shen et al, IEEE, 1994.

In completely different domains, we can distinguish two possible ways on the direction of reducing complexity, allowing at the same time some degrees of adaptation. In "The Feedback Adaptive Line Enhancer: A Constrained IIR adaptive filter", J. Chang et al, IEEE, 1993, a linear filter with a constrained structure, i.e. in which not all the coefficients or the parts are adaptable, has been proposed for line enhancement, i.e. to enhance a narrowband signal with respect to wide band noise. In "Adaptive IIR Filter Design for Single Sensor Applications", M. B. Yeary et al, IEEE, 2002, separation of signal from noise is achieved by taking into account the different properties of the autocorrelation functions of these two components of the overall signal in a context of adaptable anti-aliasing filters.

It is an object of the present invention to provide a channel estimation filter scheme at reduced complexity, which is capable of coping with third generation mobile communication scenarios.

This object is achieved by a filter apparatus as claimed in claim 1 and by a filtering method as claimed in claim 8.

Accordingly, filter means are provided having a fixed portion for providing a predetermined selectivity and having an adaptive portion for determining the frequency response of said filter means. The adaptive portion is controlled to change the frequency response. In the proposed filtering method, predetermined zero values of the filter characteristic are set to provide a predetermined filter selectivity; and at least one filter parameter is controlled to change pole values of the filter characteristic so as to provide frequency response adaptation. Thereby, the frequency response of the filter operation can change while the filter selectivity can be maintained. The channel estimation is thus able to cope with advanced system requirements while keeping the complexity and power consumption low.

A constrained structure for a linear filter is thus defined in the sense that the adaptable part of the filter is limited. In defining the part that can change the validity of AR modeling for over-sampled fading channels is taken into account. As to this aspect, it is referred to "The Linear Predictive Estimation in the Rake for Multipath-Fading Channel with White Noise of General Distributions; Q. Shen et al., 1994-IEEE.

Moreover, the adaptation scheme may be derived by taking into account the different properties of the second order statistics of the signal and noise with particular reference to the spectra of situations characterizing third generation mobile environments, such as WCDMA and/or UMTS.

The proposed adaptive filter is able to improve performance significantly at very reduced complexity, in the typical scenario foreseen for third generation mobile communication systems, such as UMTS. The linear filter can be applied to the despreaded Common Pilot Physical Channel (CPICH) for each finger of a Rake Receiver. Furthermore, the frequency response of the filter can change during the adaptation, by changing at least one pole of the filter, but the filter selectivity in correspondence of particular frequencies can be maintained, by keeping the zeros constant. This is useful to filter out undesired components with known spectra, i.e. an STTD component.

A filter coefficient adjustment procedure may be employed, which is based on the computation of 2nd-order statistic of an error function. The way in which the filter coefficients are adjusted can be particularly tailored for applications in which an oversampled signal must be separated from noise which can be considered white in a frequency band much wider than the signal frequency band.

Besides the channel phasors, estimation of the Doppler bandwidth or frequency and the long term and short term signal to noise ratio (SNR) may be allowed, which can be of interest for the online optimization of other parameters in the receiver. In particular, a procedure relying on the observation of the output and the input of the filter once the filter has reached the equilibrium can be employed for estimation of the signal to noise ratio. An iterative procedure may also be given to refine the estimated SNR, which can be applied depending on the accuracy requirement on the SNR estimates. The Doppler bandwidth, or equivalently the speed estimate can be derived from the value reached by the filter coefficients at the equilibrium and by the SNR estimate, using them as index for a predefined look-up table.

The order of the filter can be itself adapted, and in presence of a limit on the computational complexity a solution can be defined in which increasing the order of the filter does not imply any increase in the complexity. Although a flexible structure in terms of complexity is defined, it is underlined that, in the scenarios given for third generation mobile applications, such as UMTS, the first order filter is able to offer a noticeable improvement at reduced complexity, representing the best compromise in this sense.

However, different implementation choices are possible depending on the architecture on which the proposed channel estimation scheme is implemented. The computation of the statistics on which the scheme relies can be performed on a predefined number of samples, a solution well tailored for an architecture in which a first part of the scheme, e.g. measurement part, is implemented as hardware, and a second part, e.g. computation of updated coefficients, speed and SNR, is implemented as firmware. An updating scheme based only on the sign of the error function for updating the filter coefficients represents the lowest complexity version of the method.

The residual frequency offset (FO) may have a negative impact on the performance of the proposed estimation scheme. FO estimation and/or compensation can thus be performed following conventional techniques and integrated with the proposed scheme. Furthermore, more sophisticate ways of jointly Doppler Spectra/residual FO estimation can be employed.

Further advantageous modifications are defined in the dependent claims.

The present invention will now be described on the basis of a preferred embodiment with reference to the accompanying drawings, in which.

The preferred embodiment will now be described on the basis of a coherent Rake receiver as employed for example in a mobile station (MS) or user equipment (UE) of a UMTS network.

Figure 1:
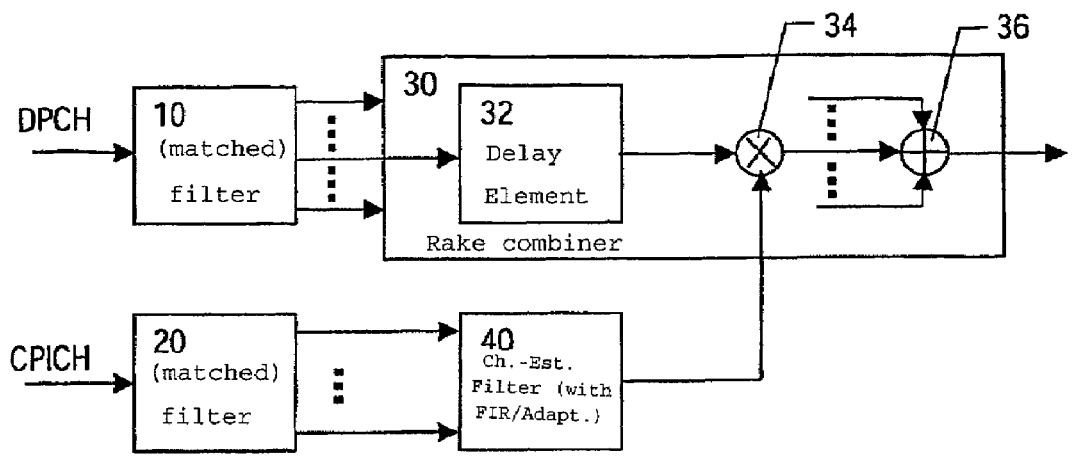
FIG. 1 shows a schematic block diagram of a coherent Rake receiver in which the present invention can be implemented.

FIG. 1 shows a schematic block diagram of the Rake receiver arrangement based on a parallel pilot channel, e.g. the WCDMA Common Pilot Physical Channel (CPICH). The received WCDMA Dedicated Physical Channel (DPCH) signal is despreaded by a first matched filter 10 and resolved into a plurality of QPSK (Quadrature Phase Shift Keying) signals that have propagated along different paths having different delays. Each resolved QPSK signal is supplied to a respective finger of a coherent Rake combiner 30. In order to perform coherent Rake combining based on the maximal ratio combining method, channel estimates are obtained using the pilot channel signal. To achieve this, the pilot channel signal is supplied to a second matched filter 20 and the resolved pilot signals are supplied to a channel estimation filter 40. Each finger of the Rake combiner 30 comprises a specific delay element 32, where the resolved QPSK signal is delayed according to its propagation delay, and a multiplying element 34, where the output signal of the delay element 32 is multiplied by the complex conjugates of a respective channel estimation signal obtained from the channel estimation filter 40. The delayed and multiplied QPSK signals of each finger are summed at a summing or adding element 36 to obtain a combined output signal at an increased level.

According to the preferred embodiment, the channel estimation filter 40 is divided into two parts, an adaptable part and a fixed part. The adaptable part of the channel estimation filter 40 that can change is a recursive part. The fixed part of the channel estimation filter 40, which can be implemented for example with a non-recursive FIR (Finite Impulse Response) filter, is able to suppress "colored noise" whose characteristics are known a priori, for example the STTD component in UMTS.

Basically, the characteristics of the channel estimation filter 40 are adaptable to the Doppler bandwidth of the pilot signal by taking into account also the signal to noise ratio (SNR). Recursive IIR (Infinite Impulse Response) filters can achieve frequency selectivity in an easier way than FIR filters. For this reason, the auto regressive (AR) part of the filter is chosen to be adaptable. The proposed scheme relies on the following assumptions:
a) the signal is over-sampled; and
b) the noise is white in the Nyquist bandwidth.

With these assumptions, valid in the case of the received pilot samples in the Rake receiver for UMTS, a constrained filter structure of the channel estimation filter 40 is derived, which is able to adapt to the signal bandwidth e.g. by using a step by step procedure to update the filter coefficients.

While adapting to the bandwidth, the procedure is also able to provide estimation of the Doppler bandwidth, and/or the speed and/or the signal to noise ratio (SNR), information that can be used in other parts of the system. The proposed solution is flexible to optionally incorporate a criteria of adaptivity for the order of the filter.

In the following, the way in which the procedure can be derived is outlined. In particular, an outline is given on the adaptation criteria, the way in which speed and/or SNR information can be extracted, and the order adaptivity can be achieved.

In the following, an m-poles, q-zeros constrained linear filter is considered of the form:

$$y_{n+k-1} = \sum_{i=l,m} \alpha_i \cdot y_{n-1} + \left(1 - \sum_{i=l,m} \alpha_i\right) \cdot \bar{x}_{n-1} \quad (1)$$

where:

$$\bar{x}_{n-1} = (h_F * x)_{n-1} \quad (2)$$

is a FIR filtered version of the input, $x_i$, q being the length of the FIR impulse response. The filter defined in such a way has a constrained structure because the coefficients of the numerator of the filter transfer function depends on the values assumed by the coefficients in the denominator. The values of $\{\alpha_i\}$ can be selected in order to minimize the following error:

$$E=\langle(y_j-x_j)^2\rangle=\text{Min} \quad (3)$$

where the mean value is extended to an interval in which the input can be considered stationary, and j define the temporal dependence of the input and the output of the filter. By imposing that the first derivatives with respect to $\{\alpha_i\}$ are zero, the following conditions can be derived:

$$\frac{dE}{d\alpha_i} = \langle(y_j - x_j)\cdot(y_{j-(k-1)-i} - \overline{x}_{j-1})\rangle = 0 \quad (4)$$

$$i = l, m$$

By assuming that the signal x is a linear superposition of a band-limited signal whose bandwidth is smaller than the Nyquist bandwidth and of white noise, it can be shown that at least until some orders of the recursive part of the filter m and some prediction lengths k, the solution of the problem can be optimally obtained step by step by considering the following system for updating the values of the coefficients $\alpha_i$:

$$\alpha_i(j+1) = \alpha_i(j) - \delta\cdot\frac{\overline{\phi}_E(i+k-1)}{\phi_E(0)} \quad (5)$$

$$i = l, m$$

where:

$$\overline{\phi}_E(n) = \langle(y_j - x_j)\cdot(y_{j-n} - \overline{x}_{j-k})\rangle$$

$$\phi_E(0) = \langle(y_j - x_j)^2\rangle$$

and $\delta$ is a coefficient related to the stability and the convergence speed of the algorithm.

As consequence of the next application of the equation (5), the values for $\{\alpha_i\}$ will change with the time, so that conditions on the poles must be imposed to preserve the filter stability, as will be shown later for a first order filter and for a second order filter.

Also, constraints between the different poles can be considered to reduce the complexity when a filter of order higher than one is considered.

Figure 2:
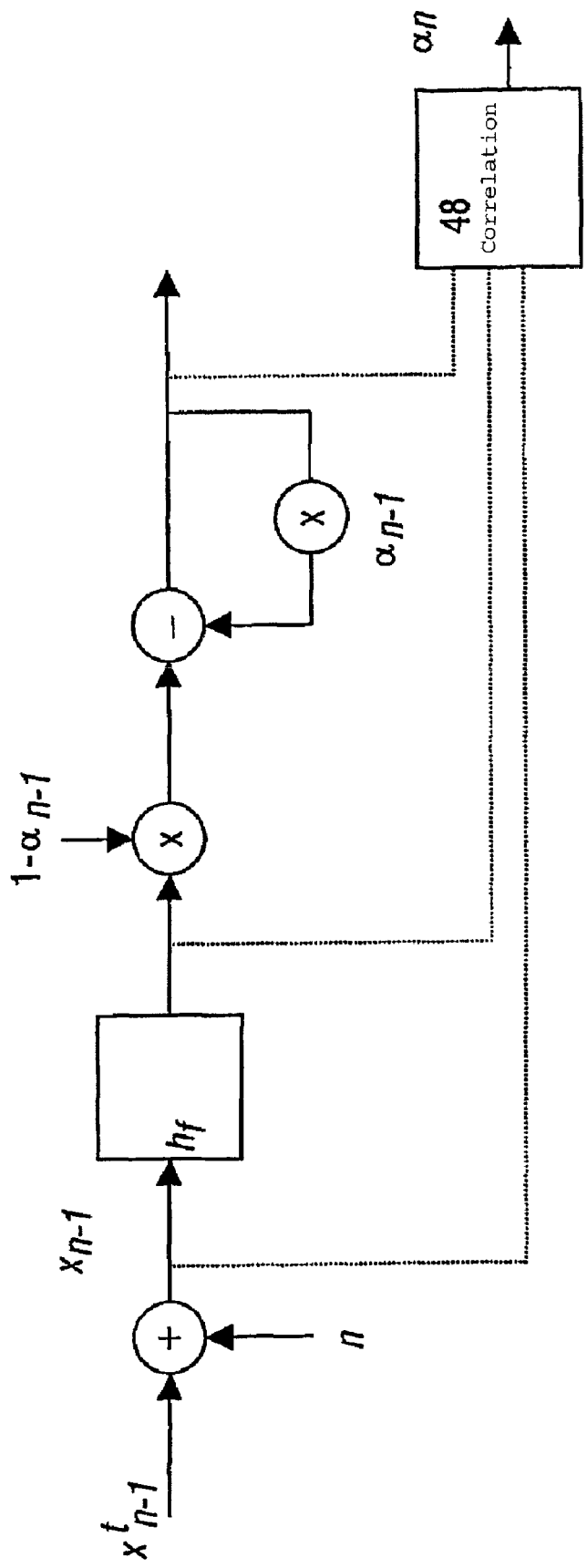
FIG. 2 shows a schematic diagram of a first order adaptive filter according to the preferred embodiment.

FIG. 2 shows a functional block diagram of a digital filter with one pole and with a prediction length equal to 1, as an example of the channel estimation filter 40 well tailored for a possible UMTS application, which also represents a solution with lowest complexity.

The following structure as represented by FIG. 2 is now assumed for the channel estimation filter 40 of FIG. 1:

$$y_n=\alpha\cdot y_{n-1}+(1-\alpha)\cdot\overline{x}_{n-1} \quad (6)$$

where:

$y_n$ is the output at the time instant n $\overline{x}_n$ is a filtered version of the input sequence, i.e.:

$$\overline{x}=h_F*x$$

where $h_F$ is an impulse response representing a low pass filter as the fixed part of the filter. A possible solution is to use a moving average filter, which assures noise and STTD rejection, for example, a FIR filter of length 4 with all coefficients equal to ¼ represents a very simple solution of this kind.

Under the constraint of minimizing the expression for the mean square error given by the equation (3), the following equation for adapting the value of $\alpha$, for a given $h_F$, can be derived:

$$\alpha(n) = \alpha(n-1) - \delta\cdot\frac{\overline{\phi}_E(1)}{\phi_E(0)} \quad (7)$$

where:

$$\overline{\phi}_E(1) = \langle(y_j - x_j)\cdot(y_{j-1} - \overline{x}_{j-1})\rangle$$

$$\phi_E(0) = \langle(y_j - x_j)^2\rangle$$

Here, the stability of the filter is assured by imposing $1>\alpha_i(n)>0, \forall n$.

The determination of the filter parameter $\alpha$ is performed by a functional correlation unit 48 to which the values required in equation (7) are supplied. The correlation procedure at the correlation unit 48 relies on some parameters, such as on the length on which to compute the mean values and $\delta$, which is related to the convergence speed for the filter, but also to the mean error in conditions of equilibrium. These aspects are discussed later also with reference to the fixed point implementation.

In the following, a procedure for speed and/or SNR estimation will be described.

Still referring to the 1-pole filter of FIG. 2, the value which the pole assumes at the equilibrium depends on the bandwidth of the signal and on the signal to noise ratio. In wireless applications, the bandwidth of the signal depends on the speed of the mobile station with respect to the base station. The way in which this kind of dependence can be derived is outlined in the following. If P(f) is the power spectra of the signal, and H(f) is the transfer function of the linear filter, the distortion introduced by filtering on the signal can be expressed as:

$$D = \int_{2f_N} P(f)df - \int_{2f_N} |H(f)|^2\cdot P(f)df \quad (8)$$

Equation (8) expresses the fact that the distortion introduced on the signal is equal to the original signal power, minus the power of the filtered signal. $2\cdot f_N$ is the Nyquist bandwidth, always bigger than the bandwidth of the signal, on the basis of the preliminary assumptions, the effective integration limit in the equation (8) depends on the signal bandwidth, i.e. on the Doppler spectrum.

The other term of noise present in the output of the channel estimation filter 40 is the component of white noise not filtered out. For N being the power of this term, it can be written:

$$N = \int_{2f_N} |H(f)|^2\cdot\sigma_N^2\cdot df \quad (9)$$

where $\sigma_N^2$ is the power spectral density for the noise, constant in the bandwidth under the assumption of white noise.

The optimal pole value is such that:

$$N+D=\text{Min} \quad (10)$$

This equation can be in general solved numerically for a given transfer function of the filter, and for a given input spectra. By using equation (10), the value of α can be obtained for which the expression in equation (10) is minimum.

Figure 3:
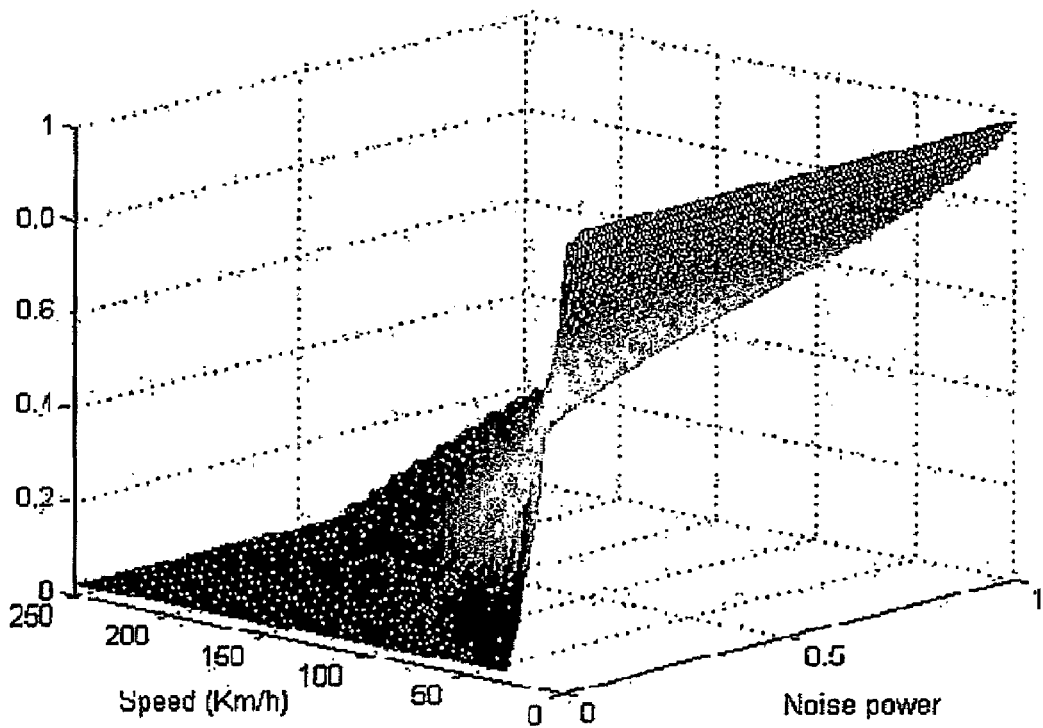
FIG. 3 shows a diagram indicating optimal filter parameter values for different speeds and noise power levels.

FIG. 3 shows a diagram indicating optimal values of α for different speeds v and noise power levels N. The curve in FIG. 3 relates to a filter given by equation (6) with $h_F$ representing a moving average on length 4. FIG. 3 thus gives the optimal value of α as function of signal to noise ratio and Doppler bandwidth, or, equivalently, speed.

Figure 4:
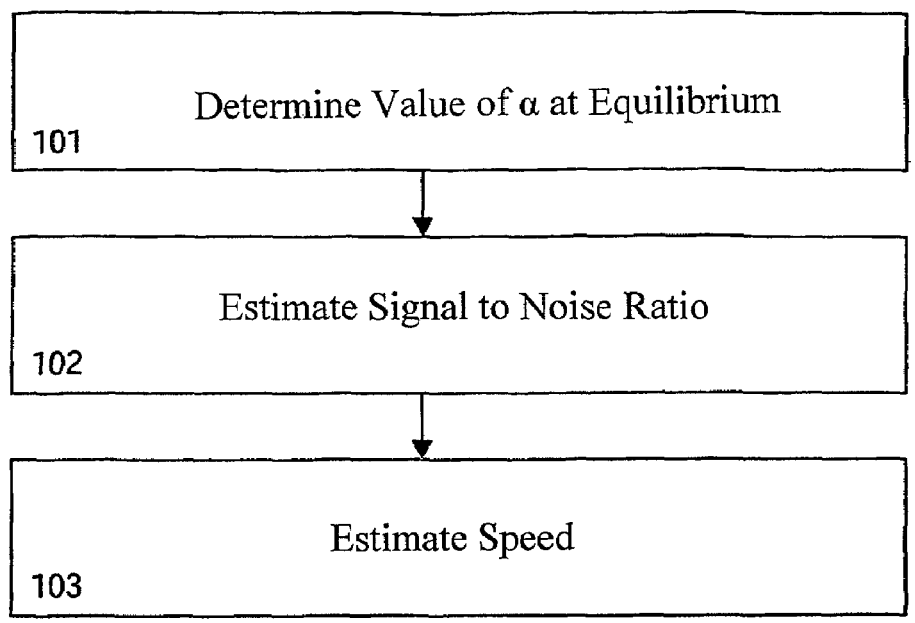
FIG. 4 shows a schematic flow diagram of a procedure for estimation of SNR and/or speed according to the preferred embodiment.

FIG. 4 shows a flow diagram of a procedure for the speed estimation which does not involve any spectral measurements. In step 101 the value of α at the equilibrium is determined. Then, in step 102, the SNR is estimated, and finally in step 103 the speed is estimated from the functional dependence as expressed by the diagram of FIG. 3.

It is noted that there can be problems of inversion of the curve giving α as function of Doppler bandwidth and SNR. With reference to FIG. 3, this problem is evidenced by the zone of the SNR/Speed plane in which α is equal to zero. This problem can be solved by using a different filter for deriving the speed and the SNR, and a function which maps the optimal α for this filter to the α for the effective filter used for filtering the channel phasors. In particular, a pure IIR filter can be used for this scope.

The following method can be used for the SNR determination or estimation in step 102 of FIG. 4. In the ideal case, the filter is filtering out only noise. This means, if x is the input of the filter, and y is the output, the power of the noise with spectral components lying outside the filter bandwidth is given by:

$$<(x-y)^2> = <n^2> = N_o \quad (11)$$

where x is the input of the filter and y the output at a generic instant.

The noise in the overall Nyquist band can be derived from $N_o$ as:

$$\sigma_N^2 = \frac{\langle n^2 \rangle}{2 \cdot f_N - \int_{2f_N} |H(f)|^2 df} \quad (12)$$

Equation (12) provides a way to extract an estimate of the noise. From this, the signal power can be extracted by using the input signal and the hypothesis that signal and noise are uncorrelated, and it can be written:

$$\sigma_s^2 = <x^2> - \sigma_N^2 \quad (13)$$

The SNR is given from:

$$SNR = \frac{\sigma_S^2}{\sigma_N^2} \quad (14)$$

It is noted that this is the long term SNR. The instantaneous SNR can be derived as follows:

$$SNR_j = \frac{y_j^2}{\sigma_N^2} \quad (15)$$

where $y_j^2$ is the filter output at the instant j.

From equation (12) it can be seen that the Nyquist frequency is present in the denominator. This means, by using different sub-sampled replicas of the input signal, the noise estimation, can be improved by merging different independent measurements.

TABLE 1

| | Sampling rate = Ny | |
|---|---|---|
| True speed value (km/h) | Mean | Sigma |
| 3 | 8.8000 | 6.6483 |
| 30 | 31.500 | 4.5 |
| 50 | 52.500 | 5.7750 |
| 70 | 73.500 | 7.3314 |
| 90 | 87.500 | 12.39 |
| 120 | 121 | 10.839 |
| 200 | 184.50 | 17.571 |
| 250 | 249 | 19.685 |

Table 1 gives true and estimated values for the speed, wherein the sampling rate corresponds to the Nyquist frequency and the signal corresponds to the descrambled/despreaded continuous pilot signal. The number of pilot symbols used for mean value computation is 4000 which corresponds to 30 frames*1/rate. The mean values are extracted on the last 2000 samples, while the mean SNR is around 2 dB for all the cases.

TABLE 2

| True speed value (km/h) | Sampling rate = Ny | | Sampling rate = ½ Ny | | Sampling rate = ¼ Ny | |
|---|---|---|---|---|---|---|
| | Mean | Sigma | Mean | Sigma | Mean | Sigma |
| 3 | 8.8000 | 6.6483 | 5.4000 | 2.8284 | 2.8000 | 0.4472 |

As put in evidence in Table 2 in particular for low speeds, the speed estimation is improved by considering a downsampled version of the signal. For low speeds the signal has a very narrow bandwidth, by occupying only a small portion of the Nyquist bandwidth. By decreasing the Nyquist bandwidth, i.e. by downsampling, the portion of bandwidth occupied by the signal gets bigger, and different values of the speed can be better resolved in terms of α.

In general, the accuracy of the noise power and SNR estimates is in the same range of the speed. Hence, the basic procedure for speed and/or SNR estimation indicated in FIG. 4 can be implemented as follows. After determination of the value of the coefficient α at the equilibrium in step 101, the SNR is estimated in accordance with equations (11), (12), and (13) in step 102. Finally, the speed is derived in step 103 from the functional dependence expressed by FIG. 3, using as input the value for α and the estimated SNR.

This estimation procedure can be further refined as follows. In fact, the expression given in equation (12) is the power of the noise outside the band of the filter only for an ideal low pass filter, tuned to the Doppler bandwidth. In a practical case, the filter transfer function has not a step shape. This implies the presence of residual signal power filtered out, even when the filter is optimally adjusted to minimize the overall distortion. This can be expressed as follows:

$$<(x-y)^2> = N_o + S_o \quad (16)$$

where $S_o$ represent the power of the signal filtered out by the filter. It can be assumed that this power is a fraction of the overall signal power, and for each Doppler speed and SNR, it can be determined as:

$$S_o\left(f_d, \frac{S}{N}\right) = \int_{2f_N} P(f) df - \int_{2f_N} |H_{opt}(f)|^2 \cdot P(f) df \quad (17)$$

The ratio:

$$\frac{S_o\left(f_d, \frac{S}{N}\right)}{S} = F_s\left(f_d, \frac{S}{N}\right) \quad (18)$$

gives a shaping factor of the optimal filter on the signal.

The filter shaping factor can be expressed as a function only of the Doppler frequency, in the following way:

$$F_s\left(f_d, \frac{S}{N}\right) = \int_{2f_N} \overline{P}(f)(1 - |H_{opt}(f)|^2) df$$

where:

$$\overline{P}(f) = \frac{1}{\sqrt{\pi^2(f^2 - f_d^2)}}$$

is usually assumed as power spectra for signals in our application.

The power of the noise outside the filter bandwidth can be written as:

$$N_o = \langle (x-y)^2 \rangle - S_o = \langle (x-y)^2 \rangle - \sigma_S^2 \cdot F_s\left(f_d, \frac{S}{N}\right) \quad (19)$$

The overall power of the noise in the Nyquist bandwidth can be written as:

$$\sigma_N^2 = \frac{N_o}{2 \cdot f_N - \int_{2f_N} |H(f)|^2 df} = N_o \cdot F_N\left(f_d, \frac{S}{N}\right) \quad (20)$$

where we introduced an equivalent filter shaping factor for the noise.

At the end we can write the two equations:

$$\sigma_N^2 = (\langle (x-y)^2 \rangle - F_s \cdot \sigma_S^2) \cdot F_N$$

$$\sigma_S^2 = \langle x^2 \rangle - \sigma_N^2 \quad (21)$$

Figure 5:
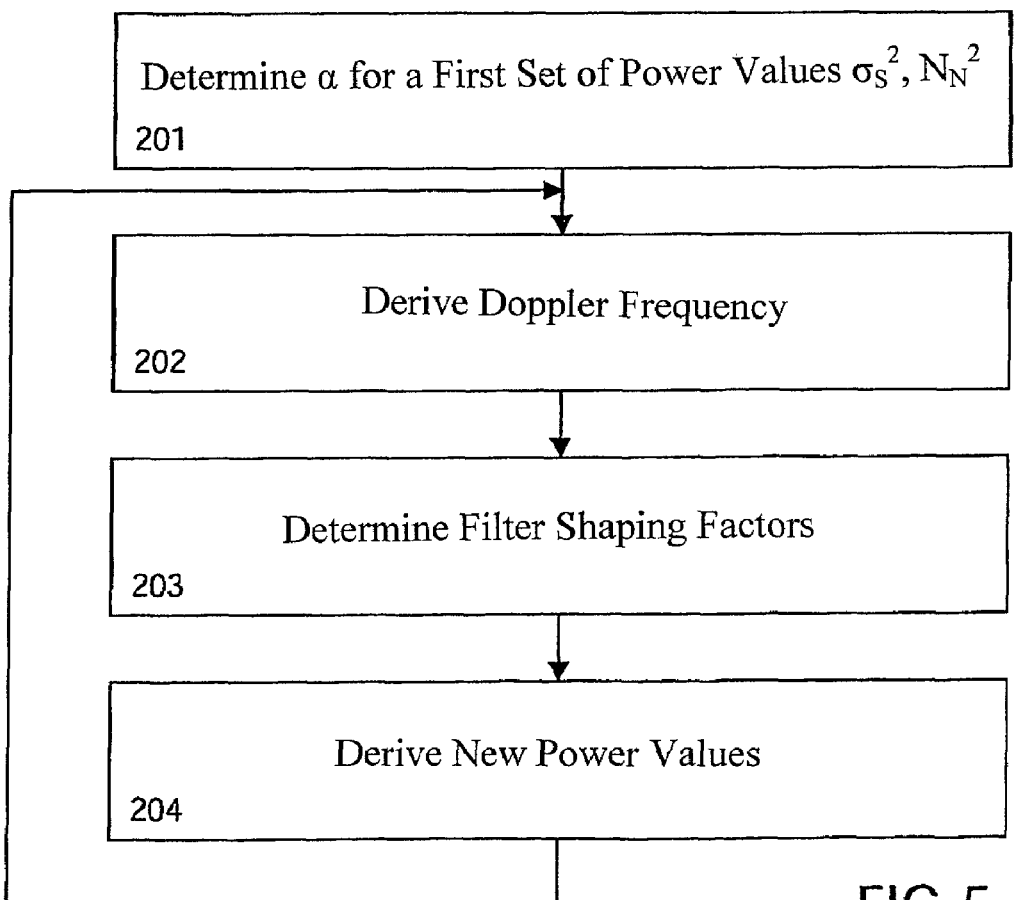
FIG. 5 shows a schematic flow diagram of an iterative procedure for improving the SNR and/or speed estimation according to the preferred embodiment.

FIG. 5 shows a flow diagram indicating an iterative procedure to refine the SNR and Doppler bandwidth or speed estimation. In step 201, equations (11) and (13) are applied to determine a first set for the power values $\sigma_S^2$, $\sigma_N^2$. Then, in step 202, the Doppler frequency is derived from the table or relationship given in FIG. 3 for a given α. In step 203, the filter shaping factors $$F_s\left(f_d, \frac{S}{N}\right), F_N\left(f_d, \frac{S}{N}\right)$$

are determined. Based on this filter shaping factors, equation (21) is applied in step 204 to derive new power values $\sigma_S^2$, $\sigma_N^2$. Then, the procedure is restarted at step 202.

It is note that the practical application of the procedure implies computation and/or storage of two tables for $$F_s\left(f_d, \frac{S}{N}\right) \text{ and } F_N\left(f_d, \frac{S}{N}\right).$$

The correlation procedure to be performed by the correlation unit 48 in FIG. 2 and expressed by equation (5) can be based on a predefined length. Floating point results can be obtained by using a length corresponding to one slot for the computation of the mean values. In UMTS, one frame corresponds to a time interval of 10 ms, and consists of 15 slots. The number of pilot symbols included in one slot is 10, which translate into 20 scalar values.

In reference to the implementation of the method, a possible approach is based on instantaneous values for the quantity (un-normalized error):

$$C(n) = (y_n - x_n^1) \cdot (y_{n-1} - \overline{x}_{n-1}) \quad (22)$$

In particular, a step-by-step procedure can be introduced in which the pole update is performed on the instantaneous samples of the un-normalized error:

$$\alpha_n = \alpha_{n-1} - \delta_n \cdot C(n) \quad (23)$$

For further reducing complexity, a "sign" implementation can be considered. In this case, the equation for the pole updating would assume the form:

$$\alpha_n = \alpha_{n-1} - \delta_u \cdot \text{sign}(C_S(n)) \quad (24)$$

It is noted that the precision for $\alpha_n$ must not be the precision of the coefficient effectively used in the filter. As an example, a precision of 10 bits can be used for the pole whose value is updated as expressed in equation (24), and a precision of 3 bits can be used for the implementation in the filter. The obtained results still show a considerable improvement as compared to a non-adaptive filter.

This step-by-step implementation can be used for cases where the preferred embodiment is fully implemented in hardware.

In the following a procedure for adapting the filter order is described.

For a two poles filter, two equations like equation (5) can be used for updating the filter coefficients. The complexity requirement for such a filter would then be doubled. The proposed particular procedure allows increasing the order of the filter, without increasing complexity.

For narrow Doppler bandwidth, and/or low SNR case, in using the one-pole filter, the pole will assume values close to 1. Then, a maximum value that the pole can reach can be fixed and the following strategy can be defined. When the pole reaches a predefined value, the value of this first pole will be kept constant and equal to this maximum value, and the adaptation will be performed on the second pole. In this way the number of poles of the filter passes from one to two. The equation for the filter will then be:

$$y_n = \alpha_1 \cdot y_{n-1} + \alpha_2 \cdot y_{n-2} + (1 - \alpha_1 - \alpha_2) \cdot \overline{x}_{n-1} \quad (25)$$

It can be shown that, $p_1$, $p_2$ being the two poles, by defining k as:

$$p_2 = k \cdot p_1$$

with:

$$0 \leq k \leq 1$$

$$p_1 = z$$

(z is a fixed value, positive and less than 1)

the following equation can be derived to update k:

$$k_n = k_{n-1} - \delta \cdot \frac{\overline{\phi}_k(1)}{\overline{\phi}_k(0)} \tag{26}$$

where:

$$\overline{\phi}_K(1) = \;<(y_n - \overline{x}_n) \cdot (p_1 \cdot (y_{n-1} - \overline{x}_{n-1}) - p_1^2 \cdot (y_{n-2} - \overline{x}_{n-1})> \tag{27}$$

This last equation can be used to determine iteratively the second pole with a complexity comparable to that of the 1-pole filter. It is noted that the procedure can be iteratively applied to introduce more poles, and also that the adaptation of the filter order can be performed in the two directions, in the sense if we are operating with a two poles filter and the second pole should assume values very close to 0 we can start working with one pole.

Figure 6:
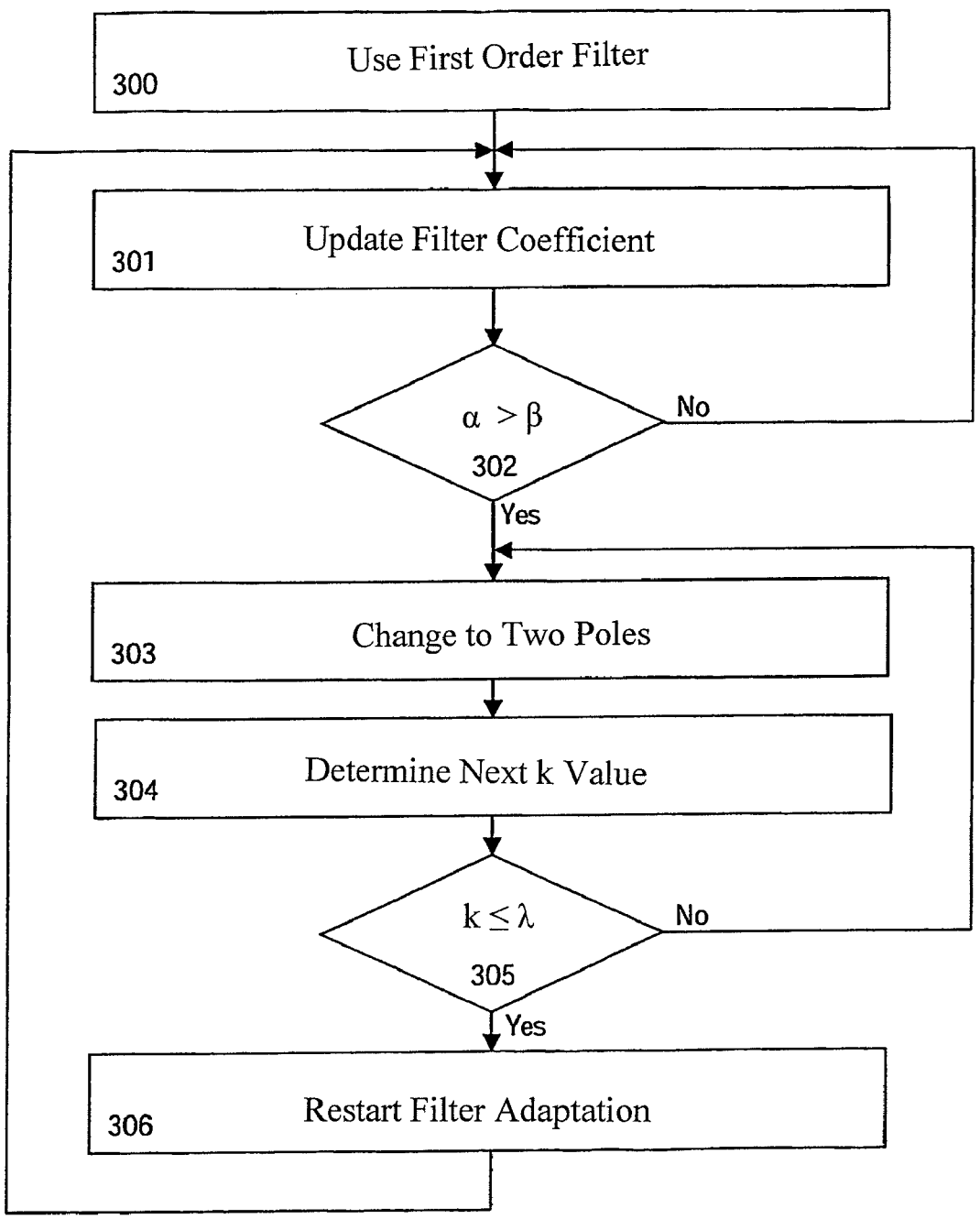
FIG. 6 shows a schematic flow diagram of a procedure for adaptation of the filter order according to the preferred embodiment.

FIG. 6 shows a schematic flow diagram indicating a summarized procedure to adapt the order of the filter. In step 300, the procedure starts form a first order filter. Then, in step 301, the filter coefficients are updated in line with equation (7). In step 302 it is checked if $\alpha > 1-\beta$ where $\beta$ is a parameter close to 0. If so, the equation for the filter is changed in step 303 to the two-poles form of equation (25), based on the following relationships:

$$p_1 = 1-\beta$$

$$p_2 = k \cdot p_1$$

$$\alpha_1 = p_1 + p_2$$

$$-\alpha_2 = p_1 \cdot p_2$$

Then, in step 304, the next value for k is determined in line with equations (26) and (27).

If the checking in step 302 is not affirmative, the procedure returns to step 301 and the coefficients are updated again.

In step 305, it is checked if $\overline{k} \leq \lambda$, where $\lambda$ is a parameter close to 0, and $\overline{k}$ is the mean value on a predefined length of k. If so, the filter adaptation is restarted in step 306 based on the predetermined structure given in equation (6), and the procedure returns to step 301 where the filter coefficients are again adapted or updated in line with equation (7).

An optional residual frequency offset mitigation is now described. The residual frequency offset (FO), i.e. the difference between the carrier frequency and the frequency of the local oscillator in the receiver unit where the present channel estimation filter is implemented, has a negative effect on the performance of the preferred embodiment, both in terms of residual error in the estimate channel phasors and in terms of speed estimation. This is due to the fact that the residual frequency offset increases the bandwidth of the received signal, with the two effects that a bigger bandwidth translates into more noise on the output of the channel estimation filter, even if the bandwidth of the receiving filter is adapted, and that the bandwidth cannot be put in relation with the maximum Doppler spectra, and then with the speed. Anyway, the method for the frequency spread estimation of the received signal gives a measure of how much the received signal is varying, both due to the frequency offset and the Doppler spread.

A mitigation of the losses implied by the frequency offset can be achieved, in first instance, by employing a local compensation loop to be applied to the received despreaded pilot before the channel estimation filter 40.

Figure 7:
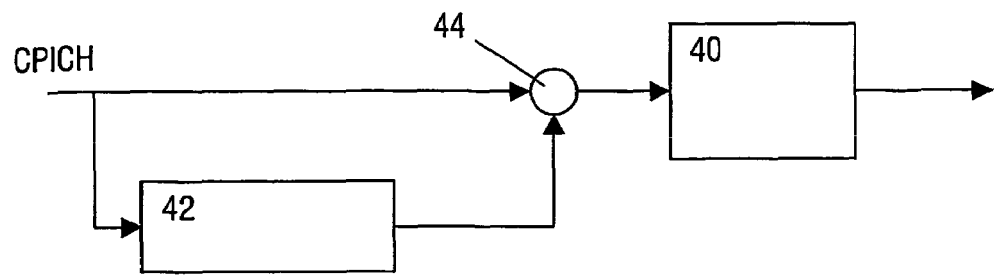
FIG. 7 shows a schematic diagram of a composite adaptive channel estimation scheme according to the preferred embodiment.

FIG. 7 shows a schematic block diagram of a composite scheme for adaptive channel estimation and feed-forward frequency offset estimation/compensation. According to this solution, a feed forward technique is used for the frequency offset compensation. This means that during an interval of length T1, an estimate of the frequency offset is extracted in a frequency offset estimation unit 42 for each finger of the Rake receiver 30 of FIG. 1, from the despreaded common CPICH pilot. This estimated value is supplied to a frequency offset compensation unit 44 for compensating the frequency offset in the next period of length T2. The compensated pilot signal is then supplied to the channel estimation filter 40. The estimation or measurement of the frequency offset can be effected periodically, to adapt to drifts of the frequency of the local oscillator, or to changes in the transmission carrier, e.g., due to a handover procedure.

It is noted that the frequency offset estimation can be performed by using conventional techniques. In particular, for the despreaded common pilot signal, a technique based on the differential detection of the phase of consecutive QPSK symbols can be used.

Figure 8:
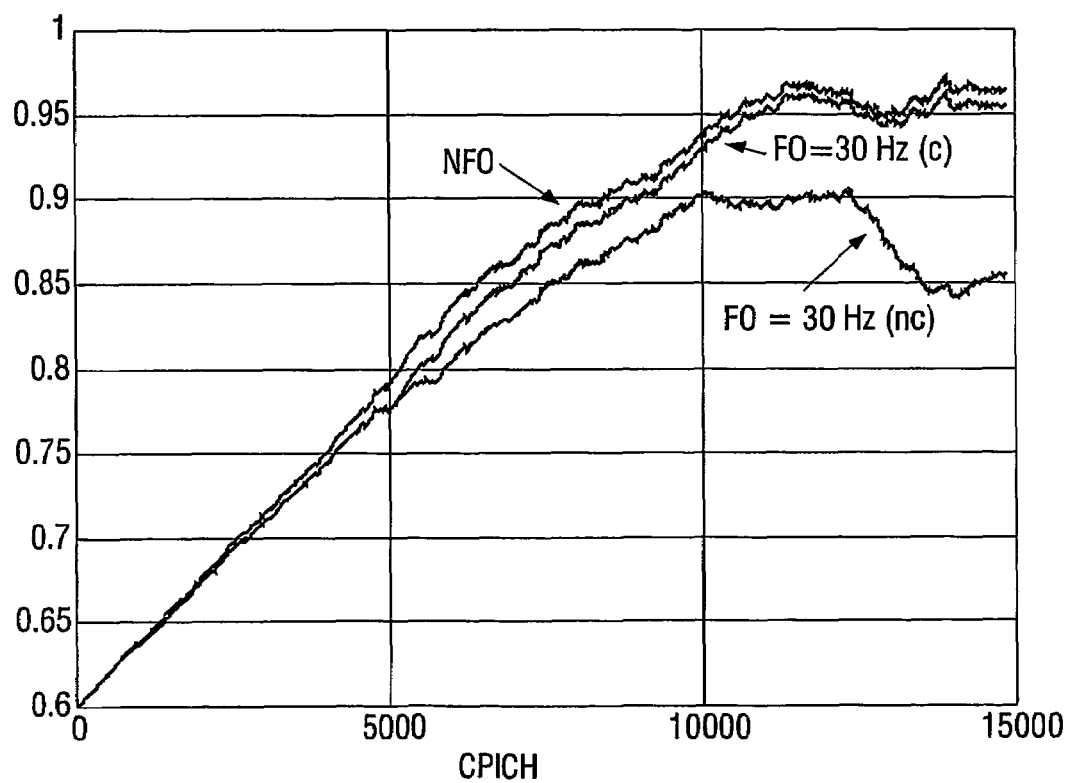
FIG. 8 shows a diagram indicating effects of the frequency offset and frequency offset compensation on the pole trajectories.

FIG. 8 shows a diagram indicating the effects of the frequency offset and frequency offset compensation on the pole trajectories in dependence on the number of CPICH samples. This figure is related to a propagation case with a speed v=3 km/h. With a residual frequency offset (FO) of 30 Hz and no compensation (nc), the pole values are smaller than in the case in which there is no residual frequency offset (NFO). This is due to the spread in the bandwidth of the received signal. If the compensation (c) of the frequency offset is performed following the scheme given in FIG. 7, the pole trajectory gets very close to the pole trajectory with no frequency offset (NFO). Thus, the effects of the frequency offset can be mitigated and the filter performance is improved.

It is further noted that the present application is not restricted to the above specific embodiment but can be used in any unit or procedure which is based on a filter procedure. In particular, the described elements of the adaptive channel estimation scheme can be implemented as hardware circuit or, alternatively or in combination, as software routines controlling a signal processing device. In the case in which a first order filter is used, the definition of the filter and of the adaptation rule incorporates also a procedure for deriving characteristics of the input signal, such like signal-to-noise ratio and Doppler spread, from the value reached by the pole of the filter. It is also worth noting that the procedures described above have a domain of applicability wider than the one considered in the preferred embodiment, i.e. channel estimation for UMTS. Indeed it can be applied in whichever situation in which a narrow band signal must be filtered out from noise, and the assumptions a) and b) of page 7 hold, by providing, also in this more general case, means for estimating the signal bandwidth and the signal-to-noise ratio.

The invention claimed is:

1. A filter apparatus comprising:
 a channel estimation filter circuit having a fixed Finite Impulse Response (FIR) portion for providing a predetermined selectivity and having an adaptive portion that uses a filter parameter for determining the frequency response of said filter circuit; and a controller for controlling said parameter to change said frequency response as a function of an output of the fixed portion, a feedback from the adaptive portion and conditions imposed to maintain stability of the filter.

2. An apparatus according to claim 1, wherein the conditions include a range of acceptable values for the filter parameter and wherein said apparatus is configured and arranged for channel estimation in a receiver of a communication system.

3. An apparatus according to claim 1, wherein said filter circuit is adapted to apply a single pole filter operation to a common pilot channel of a wireless communication system, the filter operation including a first pole that is controlled by the modification of the filter parameter and wherein the conditions include a predefined limit on the value of the filter parameter and, in response to the filter parameter reaching the predefined limit, the filter is configured to provide a two pole filter operation in which the second pole is changed using the filter parameter and without changing the first pole.

4. An apparatus according to claim 3, wherein said controller is adapted to change said frequency response by changing at least one pole of said filter circuit while keeping the zeros constant and wherein the controller is configured and arranged to iteratively introduce additional poles and to remove the additional poles as a function of the feedback.

5. An apparatus according to claim 1, wherein said controller is adapted to apply a filter coefficient adjustment procedure based on a second order statistic of an error function.

6. An apparatus according to claim 1, further comprising frequency offset estimation means for estimating a frequency offset in the signal supplied to said filter circuit.

7. An apparatus according to claim 6, further comprising frequency offset compensation means for compensating said frequency offset in said signal based on an output signal of said frequency offset estimation means.

8. A circuit-implemented filtering method comprising the steps of:
  setting predetermined zero values of a filter characteristic to provide a predetermined filter selectivity;
  filtering a received signal using the predetermined zero values;
  generating a feedback signal from the filtered signal;
  controlling, in response to the feedback signal, filter parameters to change a first pole value of said filter characteristic so as to provide frequency response adaptation; and
  changing, in response to the filter parameter reaching a limit, a second pole value of the filter characteristic while maintaining the first pole value.

9. A method according to claim 8, further comprising an estimation step for estimating a signal to noise ratio based on a statistic extracted by a filter input and output.

10. A method according to claim 9, wherein a signal bandwidth estimation is derived from a value reached by a filter coefficient at an equilibrium, and said estimated signal-to-noise ratio.

11. A method according to claim 9, wherein said estimation step comprises an iterative refinement procedure based on a determination of filter shaping factors.

12. A method according to claim 8, further comprising an adaptation step for increasing the filter order based on a determined value of a filter coefficient.

* * * * *